(12) United States Patent
Ziemkowski et al.

(10) Patent No.: US 8,511,859 B2
(45) Date of Patent: *Aug. 20, 2013

(54) MOUNTING DEVICES FOR LASERS, REFLECTORS, AND RECEIVERS

(76) Inventors: Theodore Bruce Ziemkowski, Windsor, CO (US); Patrick Gene Bashor, Loveland, CO (US)

( * ) Notice: Subject to any disclaimer, the term of this patent is extended or adjusted under 35 U.S.C. 154(b) by 222 days.

This patent is subject to a terminal disclaimer.

(21) Appl. No.: 12/831,820

(22) Filed: Jul. 7, 2010

(65) Prior Publication Data

US 2010/0271824 A1    Oct. 28, 2010

Related U.S. Application Data

(63) Continuation of application No. 12/172,250, filed on Jul. 13, 2008, now Pat. No. 7,775,683.

(60) Provisional application No. 60/952,734, filed on Jul. 30, 2007.

(51) Int. Cl.
*G02B 27/20* (2006.01)

(52) U.S. Cl.
USPC .......... 362/259; 362/269; 362/273; 362/274; 362/275; 362/419

(58) Field of Classification Search
USPC ................ 359/872–874, 876; 362/259, 277, 362/282–284, 322, 324, 449, 269, 273, 274, 362/275, 419
See application file for complete search history.

(56) References Cited

U.S. PATENT DOCUMENTS 4,160,285 A * 7/1979 Shibla ........................... 362/259
6,485,217 B2 * 11/2002 Chien et al. ................... 362/421
7,775,683 B2 * 8/2010 Ziemkowski et al. ......... 362/259

* cited by examiner

*Primary Examiner* — Stephen F Husar
(74) *Attorney, Agent, or Firm* — Krajec Patent Offices, LLC; Russell S. Krajec

(57) ABSTRACT

A mounting mechanism for a laser or reflector may consist of a gross adjustment mechanism and a fine adjustment mechanism. The gross adjustment mechanism may enable a laser or reflector to be oriented in an approximate orientation and locked in place. The fine adjustment mechanism may enable a fine and precise adjustment to be applied. The mounting mechanisms may include a mounting plate that may mount to the surface of a wall and protect the rest of the mounting mechanism from disruption, but may also allow the fine adjustment mechanism to be tuned. The mounting mechanisms may be used to create a durable yet easily adjustable laser maze amusement.

10 Claims, 12 Drawing Sheets

MOUNTING DEVICES FOR LASERS, REFLECTORS, AND RECEIVERS

CROSS REFERENCE TO RELATED APPLICATIONS

This application claims priority to and benefit of U.S. Provisional Patent Application Ser. No. 60/952734, filed Jul. 30, 2007 by Theodore Ziemkowski and Patrick Gene Bashor entitled "Mechanical System for Mounting Lasers, Reflectors, and Receivers", and U.S. patent. application Ser. No. 12/172,250, filed Jul. 13, 2008 by Theodore Ziemkowski and Patrick Gene Bashor entitled "Mechanical System for Mounting Lasers, Reflectors, and Receivers" and issued on 17 Aug. 2010 as U.S. Pat. No. 7,775,683, the entire contents of which are hereby expressly incorporated by reference.

BACKGROUND

Amusement attractions are entertaining and sometimes challenging games that bring out competitive and excited emotions from users. Haunted houses, laser tag games, and various arcade games and simulators are typical of the sort.

A successful attraction may appeal to a potential user by being relatively easy to understand, but offer a challenge to the user. Lights, sounds, and other effects may be used to interest a potential user and draw the user to the attraction.

From the operator's standpoint, a successful attraction may also be durable, easy to operate, and reliable. Durability may be a factor in attractions where a user is navigating an obstacle course, running, jumping, or otherwise moving.

SUMMARY

A mounting mechanism for a laser or reflector may consist of a gross adjustment mechanism and a fine adjustment mechanism. The gross adjustment mechanism may enable a laser or reflector to be oriented in an approximate orientation and locked in place. The fine adjustment mechanism may enable a fine and precise adjustment to be applied. The mounting mechanisms may include a mounting plate that may mount to the surface of a wall and protect the rest of the mounting mechanism from disruption, but may also allow the fine adjustment mechanism to be tuned. The mounting mechanisms may be used to create a durable yet easily adjustable laser maze amusement.

This Summary is provided to introduce a selection of concepts in a simplified form that are further described below in the Detailed Description. This Summary is not intended to identify key features or essential features of the claimed subject matter, nor is it intended to be used to limit the scope of the claimed subject matter.

DETAILED DESCRIPTION

Figure 1:
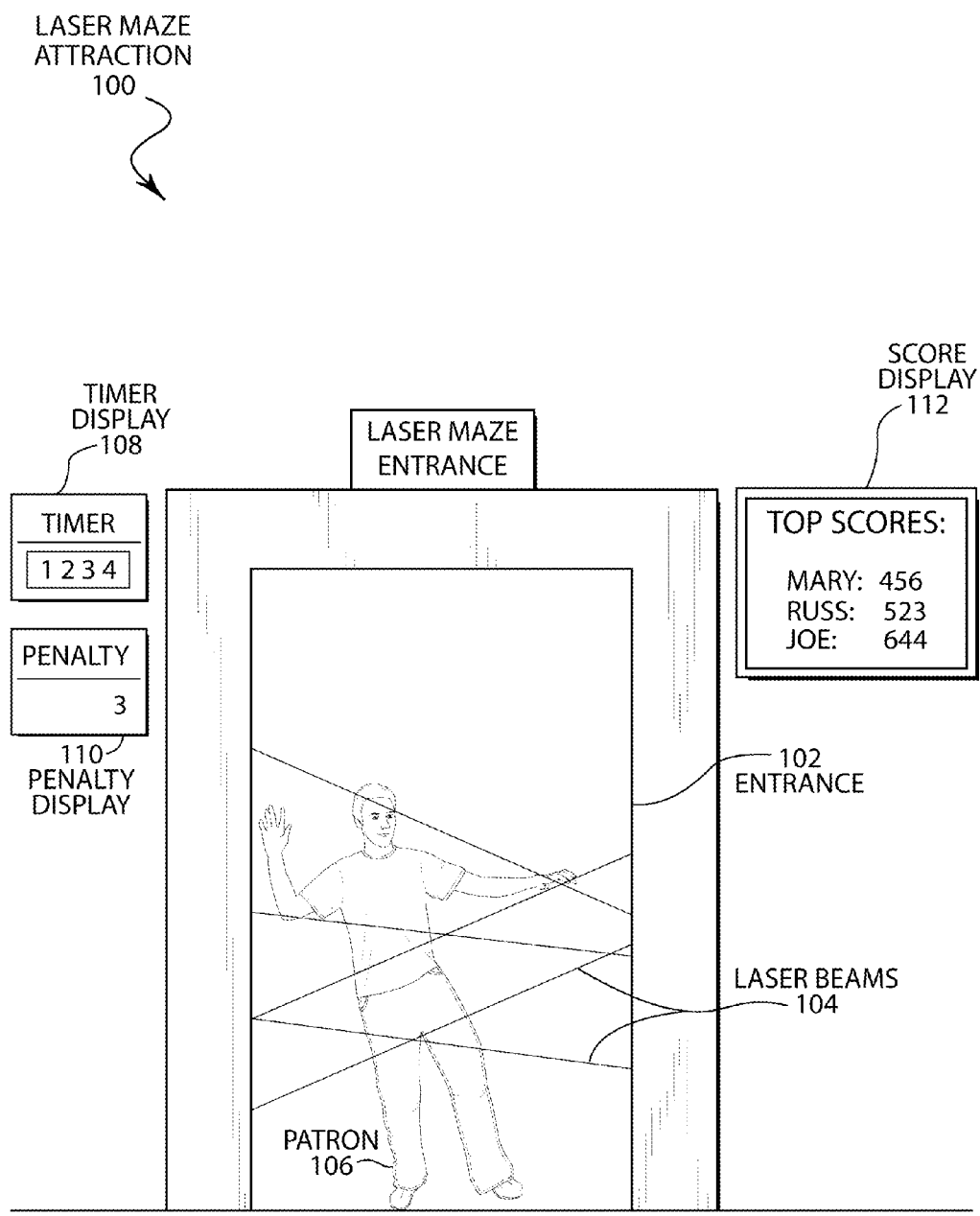
FIG. 1 is a diagram of an embodiment showing a laser maze attraction.

A laser mount and reflector mount mechanism may have a gross positioning mechanism mounted to a fine positioning mechanism. The gross positioning mechanism may enable the laser or mirror to be positioned in an approximate orientation, then the fine positioning mechanism may enable precise positioning. The positioning mechanisms may have locking features incorporated into the gross positioning mechanisms in some instances.

The laser mount may incorporate a laser transmitter that may have a spherical element as part of the laser housing. The spherical element may be captured between two plates having circular openings. When the plates are unclamped, the laser may be positioned by orienting the spherical housing, providing the gross positioning mechanism. By compressing the spherical housing between the plates, the laser may be clamped in place.

The reflector mount mechanism may incorporate a two axis gimbaled mount mechanism that may serve as a gross positioning mechanism. The gimbaled mount mechanism may have a lock mechanism for securing the reflector in a set position.

A fine adjustment mechanism may vary the angular position of a first plate with respect to a mounting plate. A gross positioning mechanism may be mounted to the first plate and the mounting plate may be fixed mounted. The fine adjustment mechanism may use several screws to adjust the angular position of the first plate in various axes with respect to the mounting plate. In one embodiment, springs may be used to provide frictional forces to keep the fine adjustment mechanism in place.

The mounting mechanisms may be mounted into a wall or other surface by a mounting plate. In some embodiments, the fine adjustment mechanism and sometimes the gross adjustment mechanism may be accessible through the faceplate, but the mechanism may be installed into a recess in the surface so that the mechanism may be protected.

The laser mount and reflector mount may be used with a receiver to create a laser maze. A laser maze may have several lasers that are oriented across a pathway. A patron may attempt to pass through the maze and may have penalties assessed for breaking a laser beam. In many embodiments, a laser maze may be a circular or linear course with an entry and exit and sensors or buttons arranged to start and stop a timer.

A laser maze may have several lasers that are positioned to be received by a sensor. In some embodiments, one or more mirrors may be used to reflect the laser beam across the patron's pathway. A controller may illuminate the lasers using various inputs and may be configured to turn off a laser then the beam has been broken. In some embodiments, two or more different sets of lasers may be illuminated in an installation to give two or more different challenges to a patron.

Specific embodiments of the subject matter are used to illustrate specific inventive aspects. The embodiments are by way of example only, and are susceptible to various modifications and alternative forms. The appended claims are intended to cover all modifications, equivalents, and alternatives falling within the spirit and scope of the invention as defined by the claims.

Throughout this specification, like reference numbers signify the same elements throughout the description of the figures.

When elements are referred to as being "connected" or "coupled," the elements can be directly connected or coupled together or one or more intervening elements may also be present. In contrast, when elements are referred to as being "directly connected" or "directly coupled," there are no intervening elements present.

The subject matter may be embodied as devices, systems, methods, and/or computer program products. Accordingly, some or all of the subject matter may be embodied in hardware and/or in software (including firmware, resident software, micro-code, state machines, gate arrays, etc.) Furthermore, the subject matter may take the form of a computer program product on a computer-usable or computer-readable storage medium having computer-usable or computer-readable program code embodied in the medium for use by or in connection with an instruction execution system. In the context of this document, a computer-usable or computer-readable medium may be any medium that can contain, store, communicate, propagate, or transport the program for use by or in connection with the instruction execution system, apparatus, or device.

The computer-usable or computer-readable medium may be, for example but not limited to, an electronic, magnetic, optical, electromagnetic, infrared, or semiconductor system, apparatus, device, or propagation medium. By way of example, and not limitation, computer readable media may comprise computer storage media and communication media.

Computer storage media includes volatile and nonvolatile, removable and non-removable media implemented in any method or technology for storage of information such as computer readable instructions, data structures, program modules or other data. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can accessed by an instruction execution system. Note that the computer-usable or computer-readable medium could be paper or another suitable medium upon which the program is printed, as the program can be electronically captured, via, for instance, optical scanning of the paper or other medium, then compiled, interpreted, of otherwise processed in a suitable manner, if necessary, and then stored in a computer memory.

When the subject matter is embodied in the general context of computer-executable instructions, the embodiment may comprise program modules, executed by one or more systems, computers, or other devices. Generally, program modules include routines, programs, objects, components, data structures, etc. that perform particular tasks or implement particular abstract data types. Typically, the functionality of the program modules may be combined or distributed as desired in various embodiments.

FIG. 1 is a diagram of an embodiment 100 showing a laser maze attraction. A laser maze attraction may have a series of laser beams that are oriented across a path which a patron attempts to follow without breaking the laser beams. Each laser may direct a beam to a sensor that can detect if the beam has been broken. The attraction may be operated so that the patron receives a score that is a combination of the time required to navigate the path with a penalty for each beam that is broken. Other effects, such as lights, sounds, and motions may be added to the attraction and may be caused to operate with certain events or when a laser beam is tripped.

The embodiment 100 shows an entrance 102 to a laser maze having several laser beams 104 and a patron 106 attempting to navigate the laser maze. The laser beams 104 may be oriented in any manner within the laser maze in order to produce obstructions to the path of the patron 106. In many embodiments, a haze generator may be used to make the laser beams visible to the patron 106.

The laser beams 104 may be oriented so that the patron may step across the beams, duck under the beams, slide to the side of a beam, crawl underneath, or otherwise contort and slither through the maze.

A timer display 108 may indicate a time or score based on the time the patron takes to traverse the path. In some instances, the timer may use real time indicator, such as counting minutes and seconds. In other instances, the timer may use a non-real time indicator, such as a number of processor counts or other time indicator.

A penalty display 110 may indicate the number of broken laser beams or a penalty associated with the number of broken laser beams. Each embodiment may have a different method for assessing a penalty for broken or tripped laser beams. Some embodiments may calculate a final score that incorporates the patron's time and any penalty for tripped laser beams. For example, a score calculator may include the patron's time in seconds plus a ten second penalty time for each laser beam that is broken.

Some embodiments may use different colored lasers, with each color having a different penalty assigned. For example, green and red lasers may be present, with red lasers having a 10 second penalty for each broken beam while assessing a 5 second penalty for breaking a green laser beam.

In some embodiments, a graduated penalty may be calculated. For example, when one beam is broken, a 10 second penalty may be added to the score but when two beams are broken, a 15 second penalty may be assessed.

In other embodiments, a score may be determined using the configuration of the laser maze. For example, some lasers in certain portions of a maze may have higher penalties than other lasers. The number of methods for calculating a score using a combination of time and tripped laser beams is infinite and may vary with the designer of a maze.

Some embodiments may combine a time and penalty for broken laser beams into a single score for each attempt by a patron. In other embodiments, the score and penalty may be tracked and recorded separately to yield a two-part score.

A score display 112 may be updated to show various data about patron scores for the attraction. In some cases, the top scores may be shown with a patron's identification. In other cases, the last several scores may be listed. The display 112 may also be used to display the rules of the attraction, how a score is calculated, advertisements for the attraction or other items, camera views of a patron in the maze, real time score for the current patron, or other information. In many cases, the display 112 may change from one screen to another showing top scores, recent scores, or other information.

In some embodiments, some or all of the timer display 108, the penalty display 110, and the score display 112 may be visible to patrons standing in line to use the attraction or may be visible to the patron 106 who is traversing the maze.

Some embodiments may have several different configurations of laser beams that may be used to obstruct a path. For example, an easy version of a maze may have a subset of the entire set of lasers operational, while a difficult version of the same maze may have the entire set of lasers illuminated. Different point values or scores may be assessed for each version of the game.

Some embodiments may have different sets of lasers operational to create a different challenge for each patron. In an example of such embodiments, each patron may be challenged with one of three subsets of laser beams. Another example may illuminate a random set of lasers so that each traversal of the maze is a different experience or challenge for the patron.

A laser may be controlled such that when the laser beam is broken, the laser is turned off. By turning off a laser when the beam is broken, a patron may be protected from having a laser beam shine directly into the patron's eye. Further, the patron will be instantly notified that the beam has been broken. In other embodiments, a laser may flash or pulsate when the beam is initially broken and may turn off completely when the beam is broken for an extended period of time. In still other embodiments, a tripped laser may be displayed at a low power setting. Some embodiments may actuate a noisemaker, light, movement actuator, or other device when a laser is broken.

Some embodiments may determine that a laser beam is broken when a sensor device receives a signal below a specific threshold. Other embodiments may be constructed so that the signal strength received by the sensor may be used to determine a penalty. For example, when a patron brushes up against a laser beam, the laser beam may be partially blocked but not completely blocked. The sensor may be calibrated to sense the partial blocking. The partially blocked beam may be used to assess a partial penalty, illuminate a warning signal, cause the beam to pulsate, or perform some other action.

Figure 2:
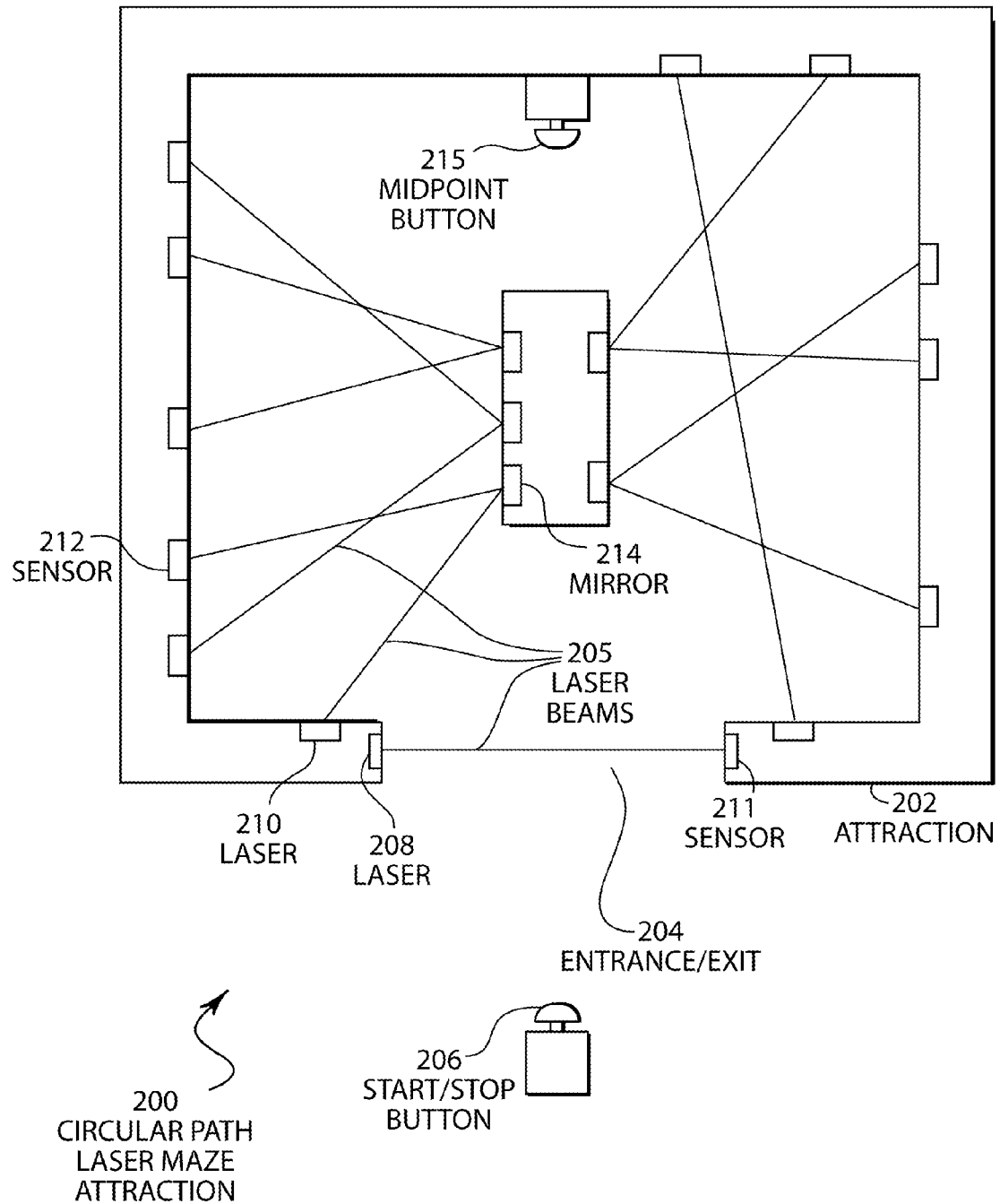
FIG. 2 is a plan view diagram of an embodiment showing a circular laser maze.

FIG. 2 is a plan view of an embodiment 200 showing a laser maze attraction with a circular pathway.

The laser maze attraction 202 has a combined entrance and exit 204. A start/stop button 206 may be used to start and stop a timer. A patron may press the start button 206, traverse the maze, press the midpoint button 215, traverse the maze again, and press the start/stop button 206 to finish the maze.

A laser maze attraction may be configured on any type of path, including circular paths having a combined entrance and exit, serpentine or tortuous paths having a separate entrance and exit, straight paths, or any other shaped path. In such paths, lasers may be oriented in any position that may provide a partial obstacle to the path. Lasers may be positioned to force a patron to twist, crawl, step over, duck under, or otherwise maneuver around the laser beams.

A laser 208 and sensor 211 may form one of the laser beams 205 across the entrance/exit 204 of the attraction 200. Another laser 210 may form two beams by bouncing from the laser 210 to the mirror 214 and to the sensor 212. Other embodiments may use multiple mirrors, prisms, beam splitters, or other devices to create different beam configurations and effects.

Figure 3:
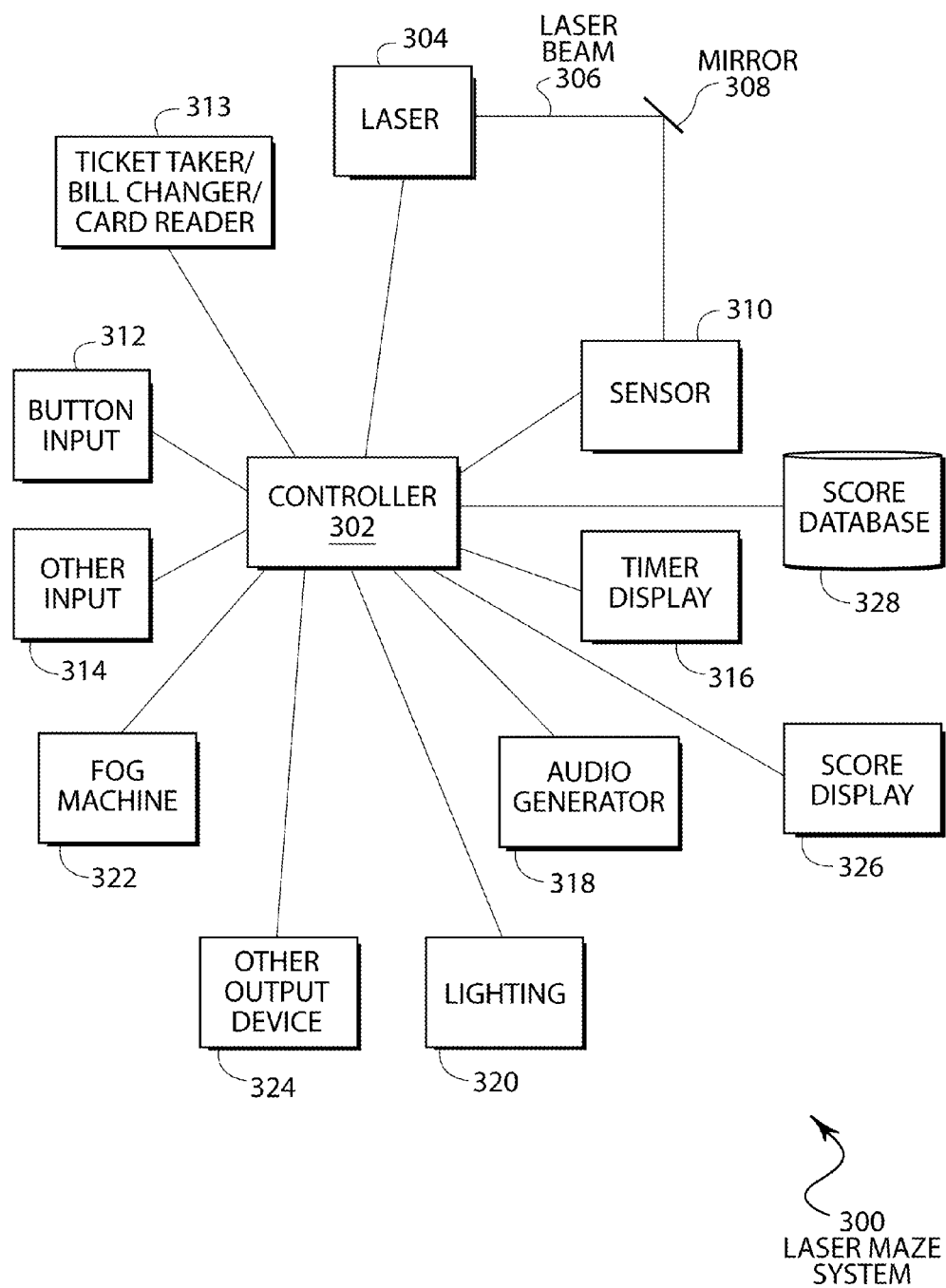
FIG. 3 is a diagram of an embodiment showing the functional portions of a laser maze system.

FIG. 3 is a diagram of an embodiment 300 showing various components that make up a laser maze system. A centralized controller 302 may perform many operations for a laser maze attraction.

The controller 302 may control multiple lasers 304 that produce a laser beam 306. The laser beam 306 may be reflected by one or more mirrors 306 and received by a sensor 310. The controller 302 may be able to turn the laser 304 on and off and receive a signal from the sensor 310.

In some embodiments, the controller 302 may be able to cause the laser 304 to pulsate, operate in sequence with other lasers, adjust intensity, or cause other changes in the laser output.

The controller 302 may be able to receive a signal from the sensor 310 to determine if the laser beam 306 has been broken. In some instances, the signal from the sensor 310 may be an on/off or single bit digital signal, while in other instances, the signal may be an analog signal or a multi-bit digital signal that has multiple values.

When a controller 302 may receive an analog or variable signal from a sensor 310, the controller 302 may be able to process the signal using a threshold to determine if the beam is broken or not. In some cases, a variable signal may be used to calculate penalties based on how much of the beam has been broken, in contrast to other cases where a penalty is assessed when the beam is completely broken.

The controller 302 may use various other inputs, such as a button input 312 or other inputs 314 to perform various actions such as starting and stopping timers, sequencing the game play, and other functions. In some cases, various inputs may be used to turn on and off the laser 304.

The controller 302 may produce various outputs to control various devices. During gameplay and after a patron has completed traversing the attraction, a timer display 316 may show a current score, a top time, or other information relating to a game in progress or a recently completed game.

Before, during, and after gameplay, various other output devices may be actuated. For example, an audio generator 318 may play noises or sounds continually. Additionally, special sounds may be played when a laser beam is broken or in response to other events, such as starting or stopping a game, achieving a high score, or some other event. Similarly, a lighting device 320 may be actuated in response to various inputs.

Other output devices 324 may include mechanical actuators, air jets, or any other controllable device. The controller 302 may be able to control any output device using any type of input.

The controller 302 may have various input and output devices for capturing and displaying information about patrons. In some cases, a patron's score may be captured, stored, and tracked. Various input devices may be used to identify a particular patron. For example, a keyboard or other input device may be used to type a patron's name, alias, or other identifier.

In another example, a patron may be issued a wristband with a barcode, radio frequency identification (RFID) identifier, or other identifier that is stored in a score database 328. When the patron uses the attraction, a barcode scanner may scan the wristband and the controller 302 may store the patron's score in the score database 328.

The controller 302 may be able to calculate a score for each use of an attraction. A history of scores may be stored in the score database 328, which may be used to determine a ranking of scores over a period of time.

In some embodiments, a contest may be held wherein a prize may be awarded for the best score over a period of time. Each patron's scores may be stored in the score database 328 and a winner may be determined over a period of time. In some instances, the period of time may be a single day or afternoon, while other instances may track scores over a period of days, weeks, or months to determine a champion.

The score database 328 may be stored in a nonvolatile memory system such as a hard disk. In some instances, the score database 328 may be located through a network connection, such as on a remote server that may be connected through the Internet.

For the purposes of this specification and the claims, a controller may be a single processor controller or a combination of multiple processors. In some cases, a portion of the functions of a controller may be performed by one processor, programmable logic device, gate array, logic device, state machine, ladder logic controller, personal computer, microprocessor, hardwired logic device, or other controller element while other functions are performed by a different controller element. For example, a personal computer may be used to perform some functions such as a user interface or network connectivity while another controller element with a separate processor performs the laser control and sensing functions. The 'controller' as used in this specification and claims may be of any architecture adapted to perform the functions described. Any reference to a controller architecture is for illustrative purposes and is not meant to be limiting.

Figure 4:
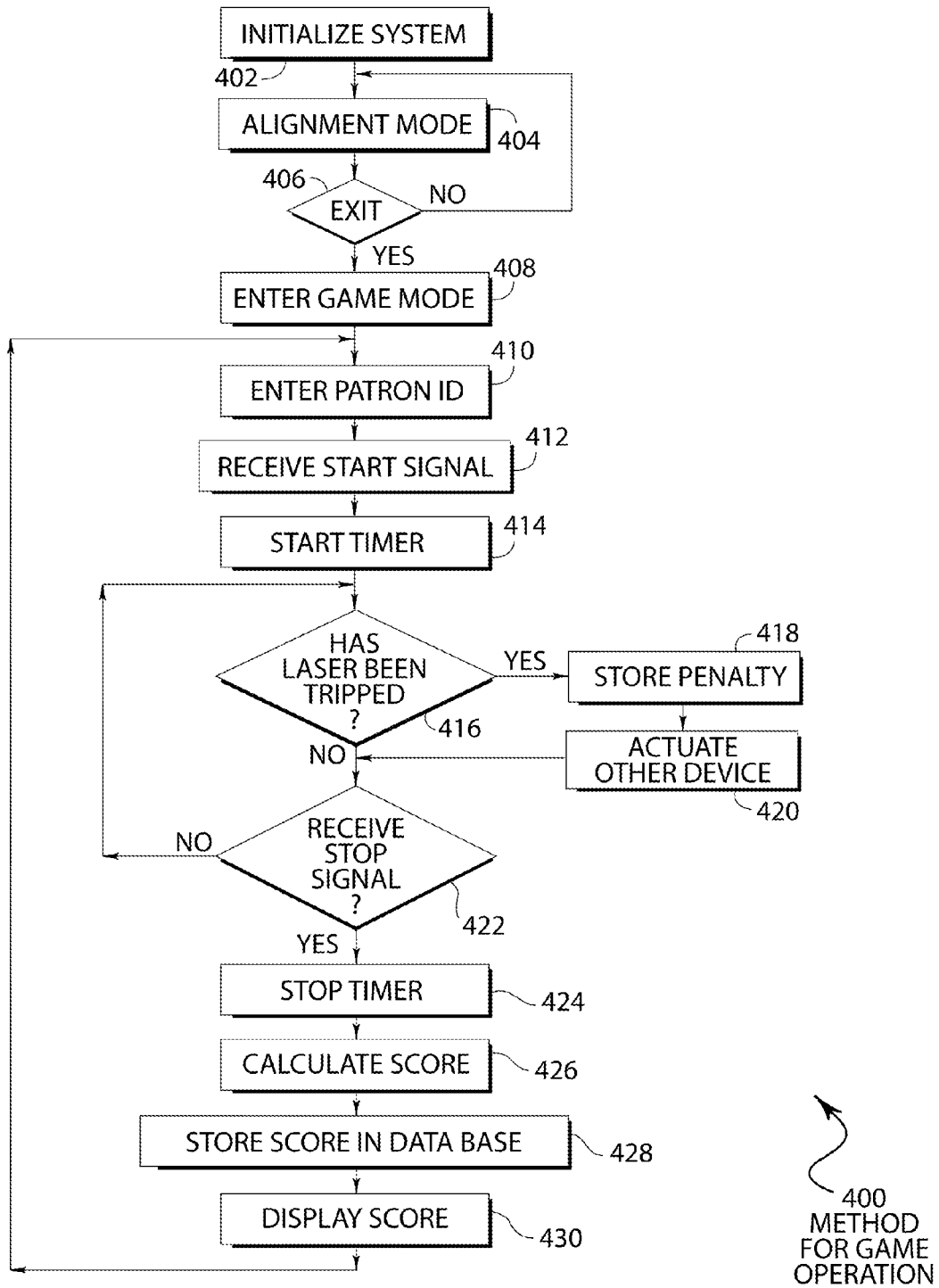
FIG. 4 is a flowchart illustration of an embodiment showing a method for game operation.

FIG. 4 is a flowchart illustration of an embodiment 400 showing a method for game operation. The method illustrates an alignment mode and a game mode.

The system is initialized in block 402 and may enter an alignment mode in block 404. In an alignment mode, each laser may be illuminated and may enable a technician to align a laser beam to strike a sensor. During alignment mode, the controller may keep the lasers illuminated even when the sensor does not receive a signal. The alignment mode may also include a display that may indicate whether each sensor is picking up a signal and may also indicate the signal strength in some embodiments. Such a display may be also used as a top score display during normal operation. Another embodiment of such a display may include LED or other indicators near the sensors or in some other location such as LEDs located on a controller board used for electrical connections.

In some embodiments, alignment mode may be entered automatically during an initialization phase. The alignment mode may be used to verify that each sensor is receiving a signal from the proper laser and that the lasers, mirrors, beam splitters, or other optical component are properly aligned so that the laser beam reaches the sensor.

In other embodiments, alignment mode may be a form of a maintenance mode of a controller. Alignment mode may be entered by using a special code, key switch, or other input signal that may be controlled by a technician. In some embodiments, alignment mode may be entered by pressing a switch or actuating a button in an electrical cabinet or a secret or inaccessible location so that patrons do not have access.

The game mode is entered in block 408.

A patron identification may be entered in block 410. In some embodiments, the patron identification may be added after the patron has finished the maze, while in other embodiments, the identification may be entered prior to entering the maze.

The patron may be identified using any type of device and in any manner. In some embodiments, a computer terminal with a display and keyboard may be used to enter a patron's identification. When a database is used with the attraction, a returning patron's identification may be selected from previous entries in the database.

In some instances, a patron's identification may be entered into a database prior to a first use of the laser maze. A patron may then select their identification from the available patron identifiers in the database.

A patron's identification may be any unique identifier. For example, an email address, name, social security number, alias, personal identification number, or any other identifier may be used, depending on the embodiment.

A start signal is received in block 412 and a timer is started in block 414. The start signal may be any input that may be used to start a timer. In the embodiment 200, a start/stop button may be used to initiate the timer. Such a button may be pressed by a patron or by an attraction operator. Other input devices, such as a sensor, may also be used to sense the patron's presence in a designated area and begin the timer.

The timer may use real time, such as minutes and seconds, to count up or down while a patron traverses the maze. Other embodiments may use a timer that does not count in real time but uses processor counts or some other timing mechanism.

While the timer is running, a patron may be attempting to navigate the laser maze and avoid tripping any laser beams. If a laser beam has been tripped in block 416, a penalty may be stored in block 418 and another device may be activated in block 420.

A penalty may be determined in many different ways. In a less complex example, each tripped laser beam may result in a single penalty. When a score is computed, the score may be adjusted based on the number of penalties. In more complex embodiments, different penalties may be assessed for different actions. For example, breaking a beam of one color may be assessed a different penalty than breaking a beam of a different color. Many variations of penalties and calculating penalties may be used.

When a laser beam is tripped, another device may be activated in block 420. For example, an air jet may be fired in the direction of the patron, a noise may be played, or a light may be flashed. In some embodiments, a mechanical actuator may be actuated to move a prop or other device within the maze.

In some embodiments, tripping a laser may change the gameplay by illuminating or turning off some lasers. For example, tripping one laser may cause another laser to be illuminated in the path of a patron, adding to the difficulty. In another example, tripping a specific laser beam may cause other lasers to turn off, lowering the difficulty and possibly lowering the potential score a patron may achieve, depending on how a score may be calculated.

If a stop signal is received in block 422, the timer is stopped in block 424, otherwise the process loops back to block 416. A stop signal may be any type of input device or sensor that is used to stop the gameplay. In the embodiment 200, the start/stop button may be pressed by a patron upon exiting the attraction to stop the timer.

After the timer is stopped in block 424, a score may be calculated in block 426. The score may be calculated in any manner. In some instances, a score may consist of a time plus any penalties for tripping laser beams. In such an instance, a lower score may be more desirable than a high score. In other instances, a score may consist of a time plus a separate variable for penalties.

In still other instances, a score may be computed based on time, difficulty, which laser beams were tripped, and other inputs, such as a score for completing a puzzle or some other variable input. In some cases, a score computation may make a higher score more desirable than a low score.

The score may be stored in a database in block 428 along with the patron identification. In some embodiments, the database may be volatile and may be reset when the attraction is reset. In other embodiments, the database may be nonvolatile and may be stored on a hard disk or a remote computer or server.

The score may be displayed in block 430. In some embodiments, a score may be displayed with other scores, such as a top three list, the last several patron's scores, or the last several scores for the patron. The scores may be displayed in many different manners on many different types of displays.

Figure 5:
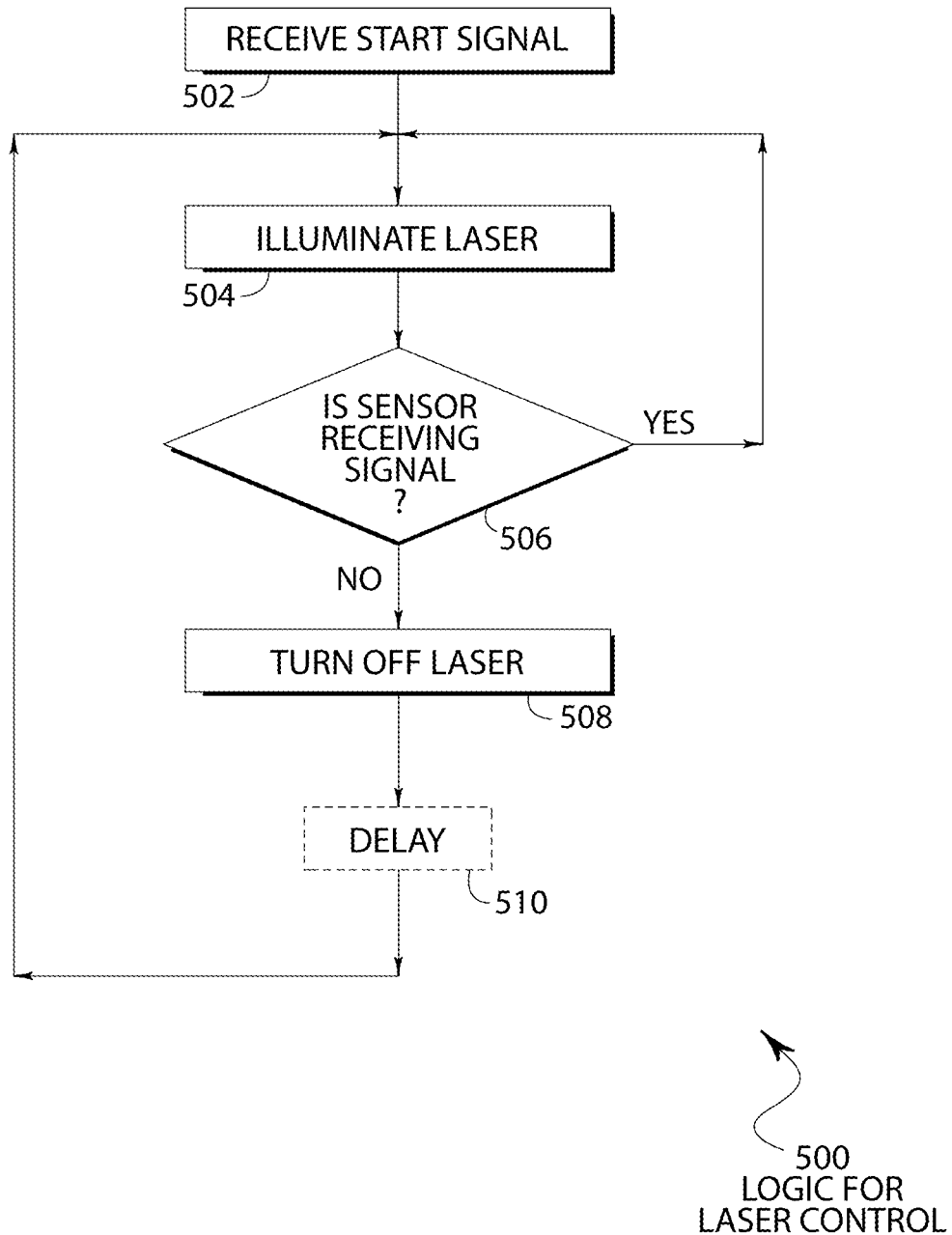
FIG. 5 is a flowchart illustration of an embodiment showing a logic for laser control.

FIG. 5 is a flowchart illustration of an embodiment 500 showing a method for controlling a laser during a game mode of a laser maze.

After receiving a start signal in block 502, the laser is illuminated in block 504. While a sensor is receiving the laser beam and generating a signal in block 506, the process loops. When the sensor stops receiving a signal in block 506, the laser is turned off in block 508.

Embodiment 500 illustrates a logic that may be employed to control a laser. The logic has several features. First, because the laser may be shut down immediately when the beam is interrupted, any damage to the eye of a patron may be prevented. Second, the visible disappearance of the laser beam may indicate to the patron that the beam has been tripped and that the patron incurred a possible penalty.

Figure 6:
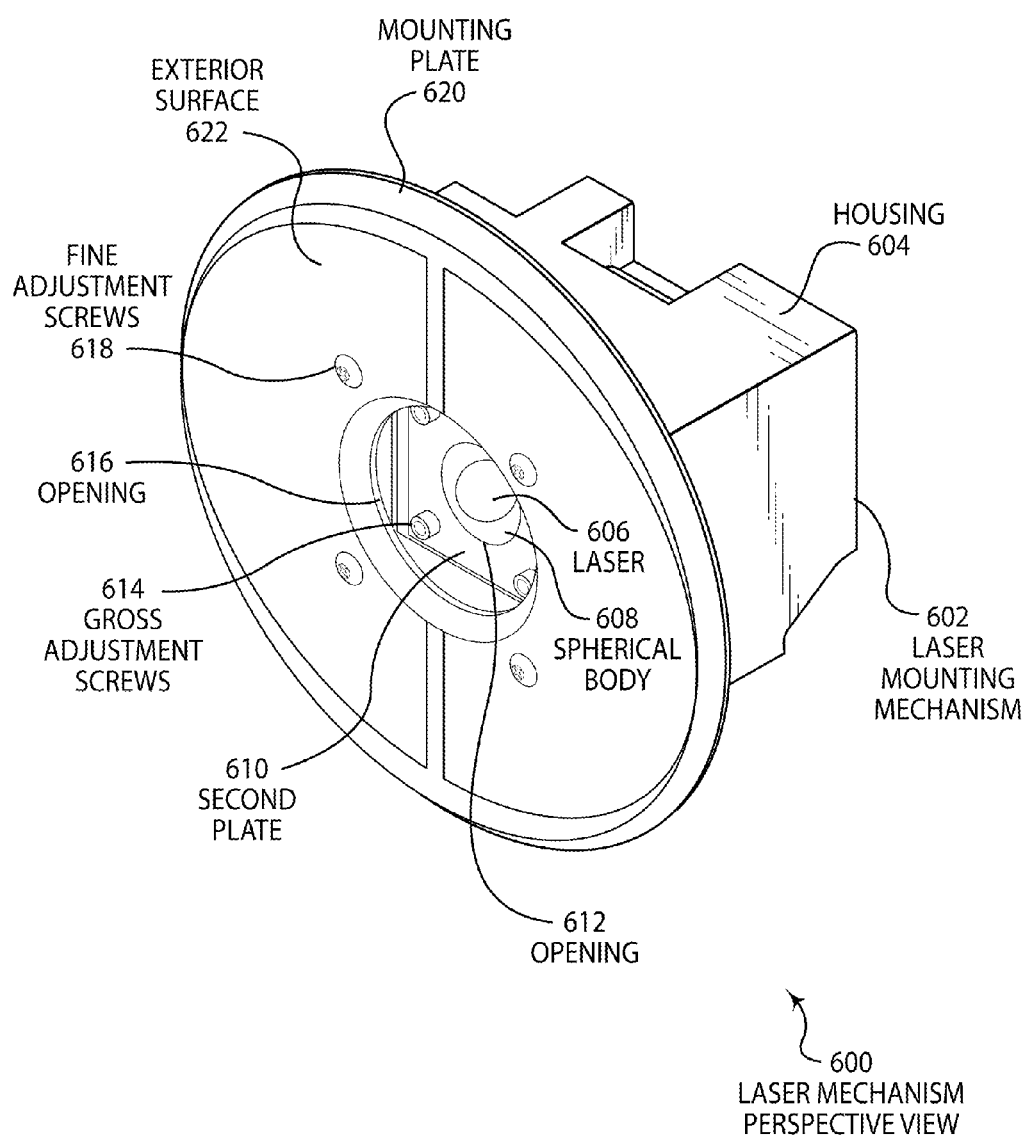
FIG. 6 is a perspective illustration of an embodiment showing a laser mounting mechanism.

FIG. 6 is a perspective illustration of an embodiment 600 showing a laser mounting mechanism. Embodiment 600 is one view of a mechanism that may include a gross adjustment mechanism and a fine adjustment mechanism. Embodiment 600 is one example of a mechanism that may be used to mount a laser in a laser maze attraction.

In a laser maze attraction, patrons often inflict a large amount of abuse on the laser maze equipment. Since a laser maze encourages a patron to traverse a course in the shortest amount of time, patrons may be running or moving at high speed. Often, patrons may slam into walls, bounce off of equipment, contact lasers and reflectors, and otherwise interact with the equipment. As such, the mounting mechanisms for lasers and reflectors may be rugged and stout to remain in service without being damaged or knocked out of alignment.

When a laser transmitter is installed, the direction of the laser can be difficult to properly orient. The laser mounting mechanism 602 enables a gross position of the laser to be set and locked into place. A fine adjustment mechanism may enable very precise positioning.

The laser mounting mechanism 602 may be mounted using a mounting plate 620. The mounting plate 620 may mount over an opening in a wall, floor, ceiling, or other surface with a housing 604 that may protrude into the surface. The mounting plate 620 may be relatively flush to the surface to minimize interference with a laser maze patron. In many cases, a mounting plate 620 may be mounted sub-flush to a surface to further minimize such interference or contact.

The laser mounting mechanism 602 may use a housing 604 to cover the mechanism. In some embodiments, the housing 604 may be a dual gang electrical box that may be used for mounting wall switches, electrical outlets, or other household or commercial electrical components. In such a case, the mounting plate 620 may be configured to engage the electrical box using fasteners in a mounting pattern similar to an electrical outlet or switch.

The laser 606 may be housed in a spherical body 608. The spherical body 608 may be held in placed and clamped between two plates that have circular holes with a smaller radius than the radius of the spherical body 608. The position of the laser may be locked in place by clamping the two plates together, capturing the laser body 608. Embodiment 600 illustrates the laser 606 being positioned to direct a laser beam directly at the viewer.

In a typical embodiment, a first plate may be mounted to a fine adjustment mechanism and may have a first opening. The laser body may be placed in the opening and a second plate 610 having a similar opening 612 may capture the laser body 608.

In some embodiments, the opening 612 may be circular, while in other embodiments, the opening 612 may be made up of several sectors of a circle that may each engage a portion of the spherical body 608.

The laser mounting mechanism may have several fine adjustment screws 618 that may be accessible from the exterior surface 622 of the mounting plate 620. The fine adjustment screws, as will be shown in later illustrations, may be used to position the gross mounting mechanism by turning the fine adjustment screws 618.

In some embodiments, the fine adjustment mechanism may have access to the adjustments through tool access holes or other features through the exterior surface 622.

The mounting plate 620 may have an opening 616 through which a laser beam may be transmitted. In some embodiments, the opening 616 may be large enough to permit access to the gross adjustment screws 614. The gross adjustment screws 614 may be used to release the spherical body 608 from between two plates so that the laser 606 may be positioned. In some embodiments, the gross adjustment screws 614 may not be accessible through the opening 616 but may be accessible through other access holes through the mounting plate 620.

In some embodiments, the opening 616 may be fitted with a translucent cover to prevent fingers or other objects from disrupting the position of the laser 606. Such a cover may be removable to permit alignment of the laser 606. In other embodiments, no such cover may be used. In many embodiments, the laser 606 may be recessed from the mounting plate 620 to minimize access and protect the laser 606 from disruption.

Figure 7:
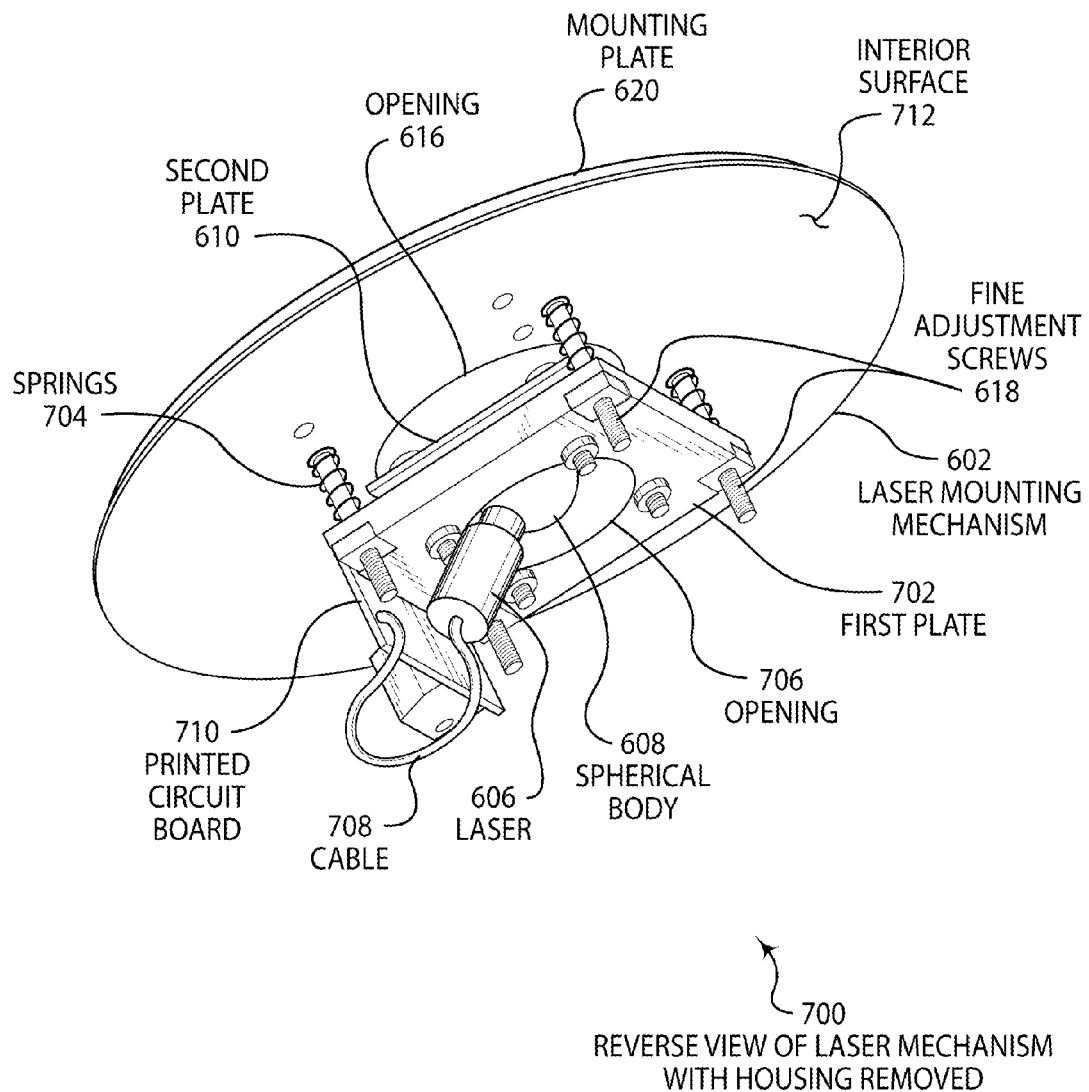
FIG. 7 is a perspective illustration of an embodiment showing the laser mounting mechanism of FIG. 6 with a housing removed.

FIG. 7 is a perspective illustration of an embodiment 700 showing the laser mounting mechanism 602 from the interior side with the housing 604 removed. Embodiment 700 shows some of the interior components including the fine adjustment mechanism and the gross adjustment mechanism.

Embodiment 700 illustrates the laser mounting mechanism 602 showing the interior surface 712 of the mounting plate 620. In a flush mounted application, the interior surface 712 may contact a wall, ceiling, floor, or other exterior surface, and the components illustrated in embodiment 700 may extend into an opening in such a surface. In a typical installation, a double gang electrical box may be installed in a recess in a wall and the mounting plate 620 fastened to the electrical box.

The laser mounting mechanism 602 may have a fine adjustment mechanism that may include a set of fine adjustment screws 618 and springs 704 that may adjust the position of a first plate 702 with respect to the mounting plate 620. By turning the four fine adjustment screws, the angle of the first plate 702 may be adjusted with respect to the mounting plate 620. The springs 704 may be selected to add some friction to the thread engagement so that the fine positioning mechanism may remain in place even when subjected to vibration. The springs 704 may also serve to hold the first plate 702 away from the mounting plate 620 in a compliant manner.

Embodiment 700 illustrates a fine positioning mechanism that uses four fine adjustment screws. In some embodiments, two or three adjustment screws may be used.

The gross adjustment mechanism of embodiment 700 may consist of a first plate 702 with an opening 706 and a second plate 610. The laser 606 may be housed in a spherical body 608 that may be captured between the opening 706 and the opening 612 as illustrated in embodiment 600. The gross adjustment screws 614 may clamp the second plate 610 to the first plate 702 to secure the spherical body 608 in place. By loosening the gross adjustment screws 614, the spherical body 608 may be repositioned.

In some embodiments, a clamping mechanism may be used to provide compressive force between the first plate 702 and second plate 610. An over-center clamp or any other clamp-type mechanism may be used in various embodiments.

The laser 606 may have a cable 708 that may connect to a printed circuit board 710. The laser beam may be transmitted through the opening 616. The laser 606 may consist of a cylindrical body with a spherical element. The cable 708 may enter the cylindrical body at one end and the laser beam may be emitted from the opposite end.

Figure 8:
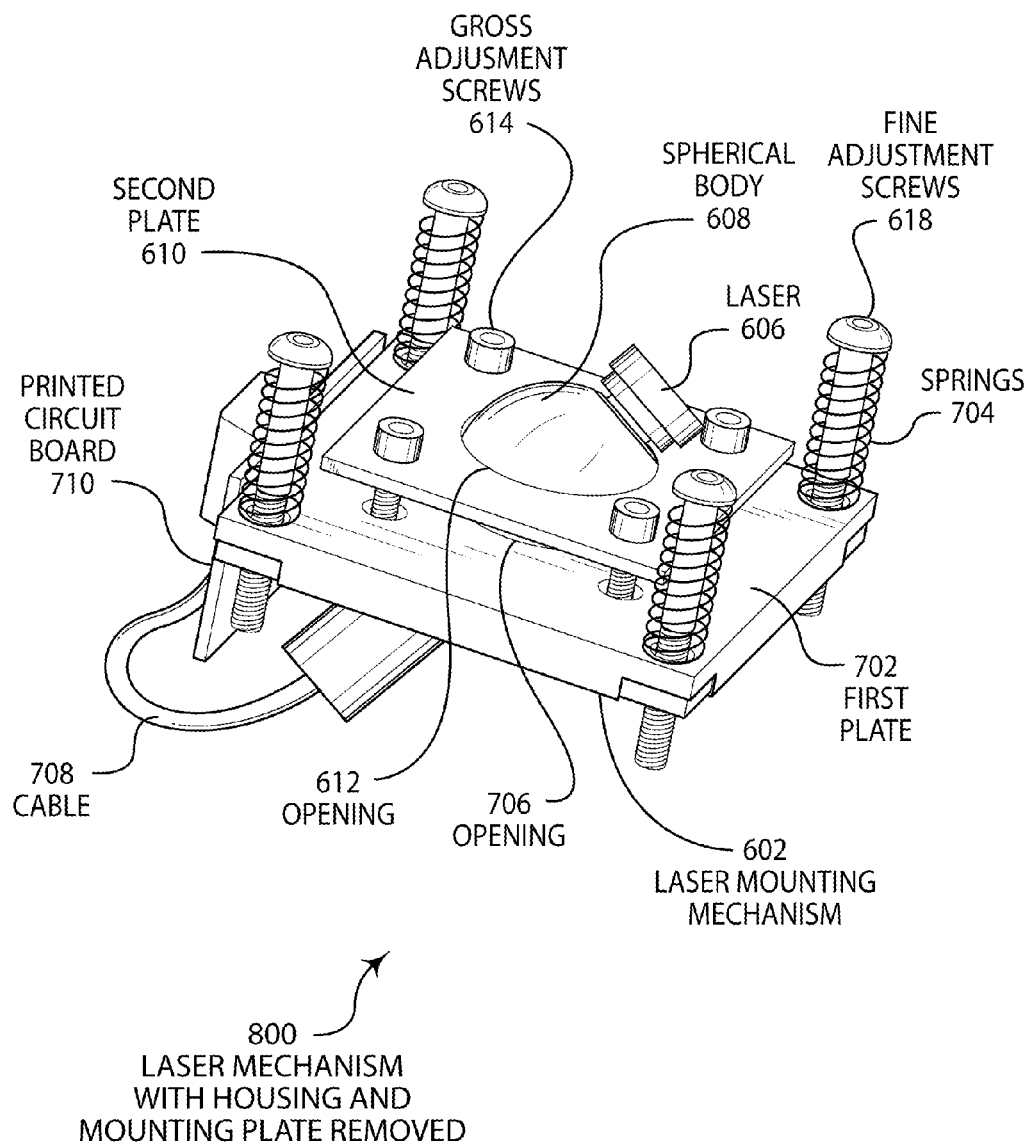
FIG. 8 is a perspective illustration of an embodiment showing the laser mounting mechanism of FIG. 6 with a housing and mounting plate removed.

FIG. 8 is a perspective illustration of an embodiment 800 showing the laser mounting mechanism 602 from the exterior side with the housing 604 and mounting plate 620 removed.

The first plate 702 is shown with the four fine adjustment screws 618 and springs 704.

The spherical body 608 of the laser 606 is shown captured between the opening 706 of the first plate 702 and the opening 612 of the second plate 610. The gross adjustment screws 614 may create a compressive force between the first plate 702 and second plate 610.

Embodiment 800 shows the cable 708 connecting the laser 606 to the printed circuit board 710.

Figure 9:
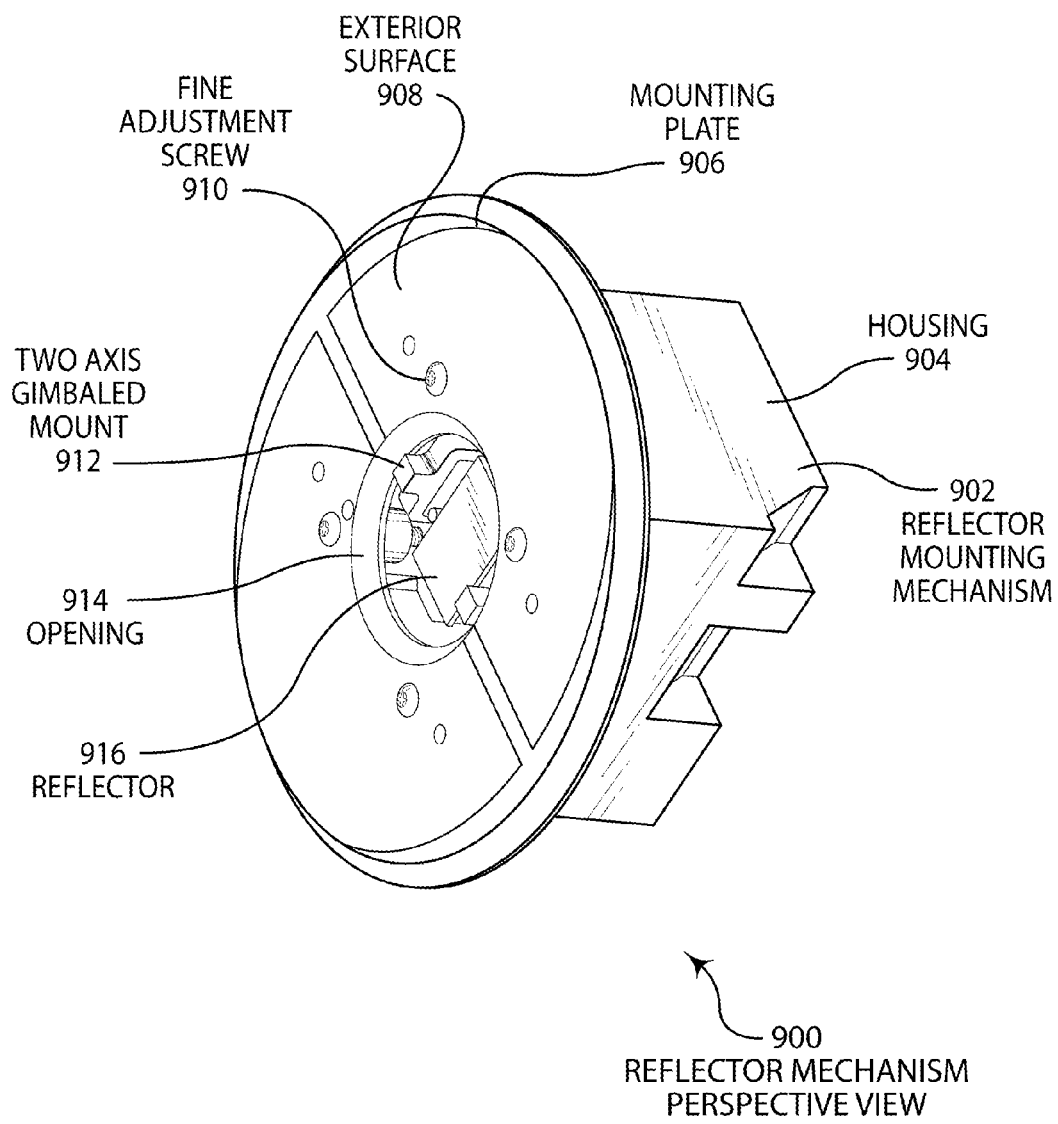
FIG. 9 is a perspective illustration of an embodiment showing a reflector mounting mechanism.

FIG. 9 is a perspective illustration of an embodiment 900 showing a reflector mounting mechanism 902. The reflector mounting mechanism 902 may have a gross adjustment mechanism coupled with a fine adjustment mechanism. The gross adjustment mechanism may consist of a two axis gimbaled mount 912. The fine adjustment mechanism may be similar to the fine adjustment mechanism of the laser mounting mechanism 602.

The reflector mounting mechanism 902 may have a housing 904. The housing 904 may be mountable in a recess of a wall, ceiling, or floor, and may serve to protect the mechanism from damage.

In many embodiments, the mounting plate 902 may mount against a mounting surface such that the exterior surface 908 is exposed in a similar manner as mounting plate 620.

The mounting plate 906 may have several fine adjustment screws 910 that may be accessible from the exterior surface 908 of the mounting plate 906. The fine adjustment screws 910 may operate in a similar fashion as the fine adjustment screws 618.

The reflector 916 may be a mirror or other reflective device that may be used to bounce or reflect a laser beam or other light source. When used for reflecting a laser beam, the positioning of the reflector 916 may be done with great precision. The two axis gimbaled mount 912 may be capable of positioning the reflector 916 in an approximate location, and the fine adjustment screws 910 may be used to precisely orient the reflector 916 into a final position.

In many embodiments, the two axis gimbaled mount 912 may have a locking feature or may have sufficient friction so that the reflector 916 may be placed in position and survive vibrations without moving out of position.

In some embodiments, the opening 914 may be fitted with a translucent cover that may protect the two axis gimbaled mount 912 from disruption. In some embodiments, such a cover may not be used and the reflector 916 may be recessed from the opening 914 to minimize access.

Figure 10:
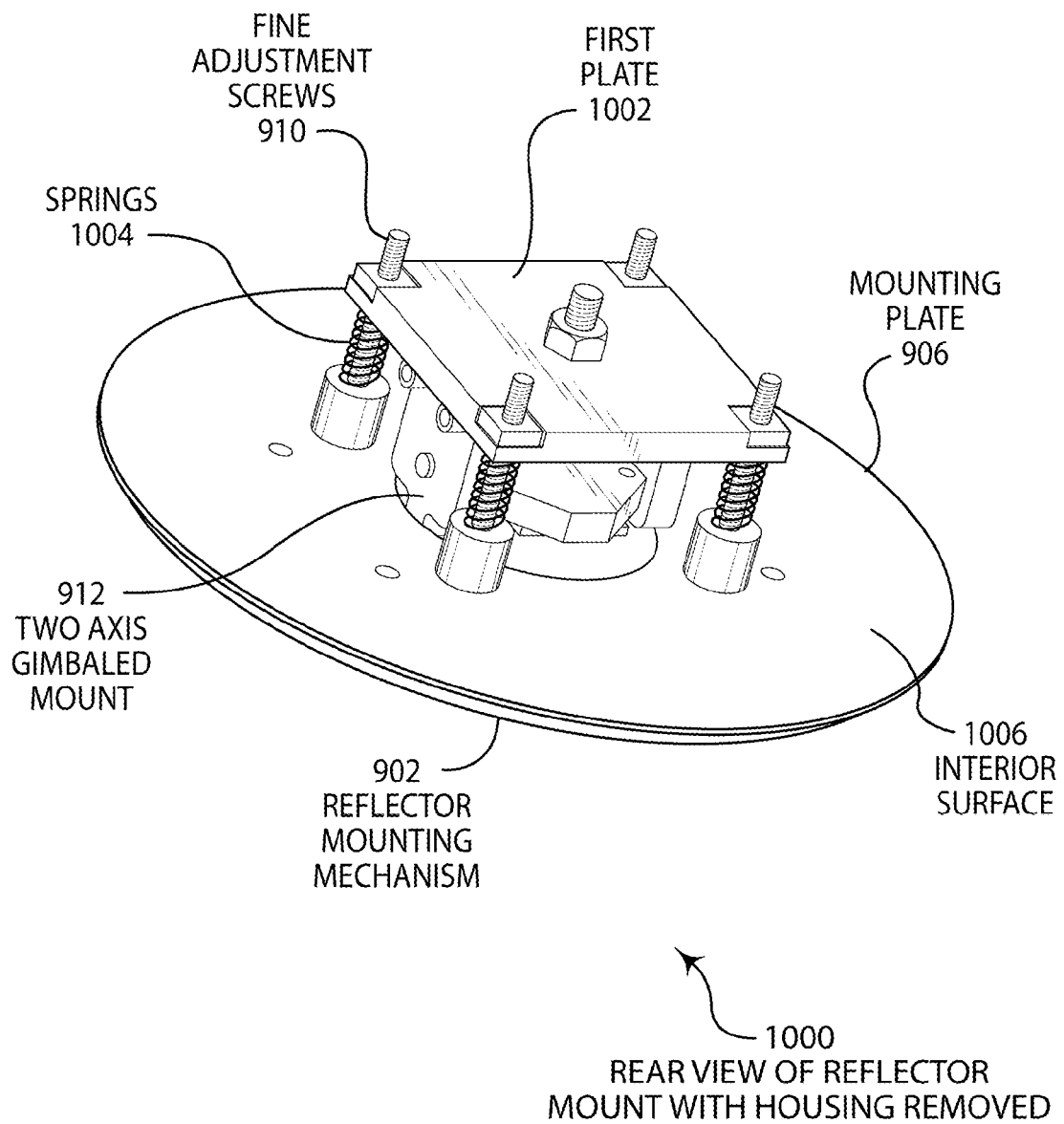
FIG. 10 is a perspective illustration of an embodiment showing the reflector mounting mechanism of FIG. 9 with a housing removed.

FIG. 10 is a perspective illustration of an embodiment 1000 showing a rear view of the reflector mounting mechanism 902 with the housing 904 removed.

Embodiment 1000 shows the mounting plate 906 with the interior surface 1006 shown. The interior surface 1006 may be mounted against a wall, ceiling, floor, or other mounting surface such that the mechanism 902 may be placed in a recess in the mounting surface.

The reflector mounting mechanism 902 may have a fine adjustment mechanism that consists of a first plate 1002 held in place by four fine adjustment screws 910 and springs 1004. The two axis gimbaled mount 912 may be mounted to the first plate 1002. The fine adjustment mechanism in embodiment 1000 may be similar to the fine adjustment mechanism of embodiment 700.

Figure 11:
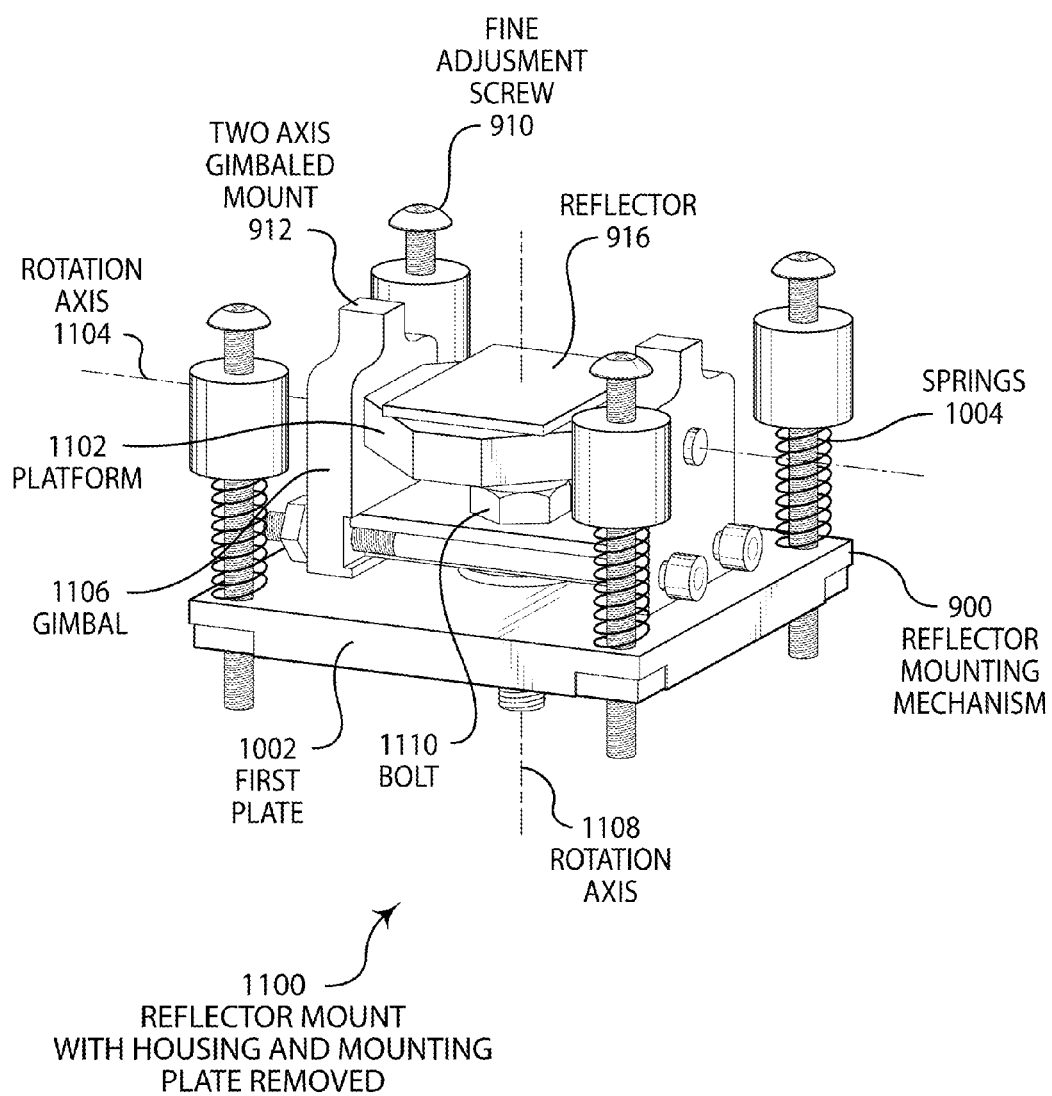
FIG. 11 is a perspective illustration of an embodiment showing the reflector mounting mechanism of FIG. 9 with a housing and mounting plate removed.

FIG. 11 is a perspective illustration of an embodiment 1100 showing a front view of the reflector mounting mechanism 902 with the housing 904 and mounting plate 906 removed.

Embodiment 1100 shows the first plate 1002 with four fine adjustment screws 910 and springs 1004. The fine adjustment screws 910 and springs 1004 may operate to adjust the angular position of the first plate 1002 with respect to a mounting plate.

The two axis gimbaled mount 912 may comprise a platform 1102 on which the reflector 916 may be mounted, along with a gimbal 1106. The platform 1102 may be capable of rotating along the rotation axis 1104 that may be substantially parallel to a plane defined by the first plate 1002.

The gimbal 1106 may be mounted using the bolt 1110 and may rotate with respect to the first plate 1002 along the rotation axis 1108. The rotation axis 1108 may be generally perpendicular to a plane defined by the first plate 1002.

The two axis gimbaled mount 912 may enable the reflector 916 to be oriented by rotation along the rotation axes 1104 and 1108.

In many embodiments, a locking screw, set screw, or other locking mechanism may be used to lock the two axis gimbaled mount 912 in one or both axes. In other embodiments, the two axis gimbaled mount 912 may be constructed such that sufficient friction exists along the axes of rotation so that the platform 1102 and gimbal 1106 may stay in place even when subjected to severe vibration.

Figure 12:
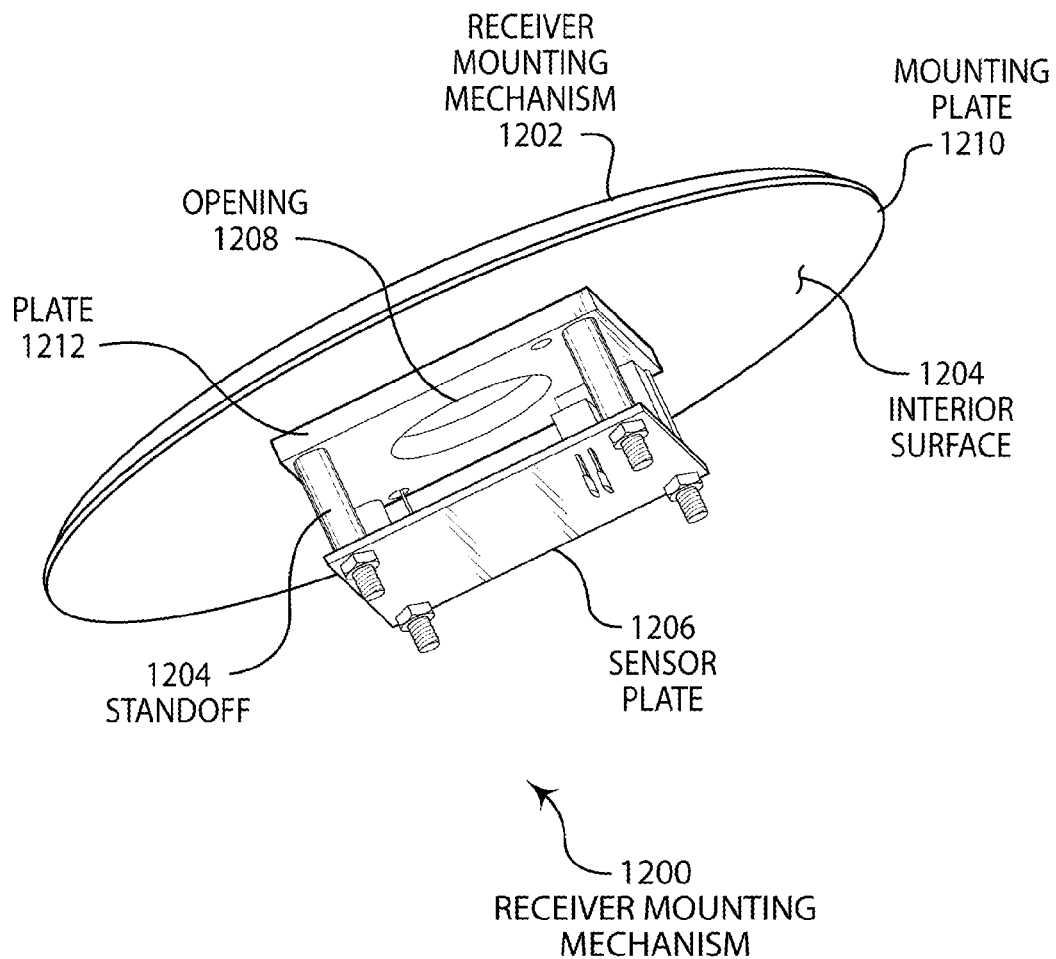
FIG. 12 is a perspective illustration of an embodiment showing a sensor mounting mechanism.

FIG. 12 is a perspective illustration of an embodiment 1200 showing a receiver mounting mechanism 1202. The receiver mounting mechanism 1202 may contain a receiver that may receive and detect a laser beam in a laser maze or other application.

The receiver mounting mechanism 1202 may have a similar construction and mounting mechanism as the laser mounting mechanism 602 and reflector mounting mechanism 902. The receiver mounting mechanism 1202 may have a mounting plate 1210, of which the interior surface 1204 may be shown. The mounting plate 1202 may mount against a surface of a wall, ceiling, floor, or other mounting surface and the mechanism of the receiver mounting mechanism 1202 may be in a recess in the mounting surface.

The receiver mounting mechanism 1202 may include a sensor plate 1206. The sensor plate 1206 may have a photo-electric or other type of sensor mounted on the opposite side of the sensor plate. In many embodiments, a diffuser may be placed in the opening 1208 so that the sensor may detect the presence of a small amount of light impinging on the opening 1208.

The sensor plate 1206 may be a printed circuit board on which a sensor element may be soldered or otherwise connected.

The sensor plate 1206 may be rigidly mounted to the mounting plate 1210 by a set of four standoffs 1205 and associated hardware. In some embodiments, a plate 1212 may mount to the mounting plate 1210 and may include the opening 1208.

In many embodiments, the opening 1208 may be fitted with a translucent element. In many such embodiments, the translucent element may be etched, frosted, or otherwise made to diffuse incoming light. By having a diffusion element in the opening 1208, light that impinges on the opening 1208 may be scattered and sensed by a sensor. The diffusion may enable the sensor to detect a laser beam that impinges any portion of the opening 1208 without having to directly impinge the sensor.

The laser mounting mechanism 602, the reflector mounting mechanism 902, and the receiver mounting mechanism 1202 may be used with a controller to create a laser maze system. The various mounting mechanisms may be mounted using a mounting plate with much of the mounting mechanism recessed into a mounting surface such that the mounting mechanisms may be not be jarred or otherwise disrupted during the use of the laser maze.

The laser mounting mechanism 602 and reflector mounting mechanism 902 may incorporate a gross adjustment mechanism and a fine adjustment mechanism. The gross adjustment mechanism may enable a technician to quickly orient the laser or reflector in an approximate orientation and lock the laser or reflector in place. A fine adjustment mechanism may allow the technician to finely tune the position of the laser or reflector to a precise orientation.

The foregoing description of the subject matter has been presented for purposes of illustration and description. It is not intended to be exhaustive or to limit the subject matter to the precise form disclosed, and other modifications and variations may be possible in light of the above teachings. The embodiment was chosen and described in order to best explain the principles of the invention and its practical application to thereby enable others skilled in the art to best utilize the invention in various embodiments and various modifications as are suited to the particular use contemplated. It is intended that the appended claims be construed to include other alternative embodiments except insofar as limited by the prior art.

What is claimed is:

1. A laser transmitter holder comprising:
   a laser transmitter mounted in a body having at least a partially spherical section, said spherical section having a first radius;
   a first plate having a first opening defined by a second radius, said second radius being smaller than said first radius;
   a second plate having a second opening defined by a third radius, said third radius being smaller than said first radius, said laser transmitter being disposed between said first plate and said second plate such that said spherical section engages said first opening and said second opening; and
   a mounting plate configured to mount said laser transmitter holder to a mounting surface.

2. The laser transmitter holder of claim 1, said first opening comprising at least one sector having said first radius.

3. The laser transmitter holder of claim 2, said first opening comprising a plurality of sectors having said first radius and a common center point.

4. The laser transmitter holder of claim 1, said second opening comprising a plurality of sectors having said first radius and a common center point.

5. The laser transmitter holder of claim 1, said first plate and said second plate applying compressive force to hold said laser transmitter, said compressive force being applied by at least one screw.

6. The laser transmitter holder of claim 1, said first plate and said second plate applying compressive force to hold said laser transmitter, said compressive force being applied at least in part by a clamp mechanism.

7. The laser transmitter holder of claim 1, said mounting plate having an interior surface mountable against said mounting surface and an exterior surface opposite said interior surface.

8. The laser transmitter holder of claim 7, said first plate and said second plate being mountable interior to said mounting surface.

9. The laser transmitter holder of claim 8, said mounting plate having a fine adjustment access mechanism comprising at least one screw head mounted exterior to said exterior surface.

10. The laser transmitter holder of claim 8, said mounting plate having a fine adjustment access mechanism comprising at least one tool access hole through said mounting plate.

* * * * *